Feb. 21, 1939.　　　A. R. BROTHERS　　　2,147,625
NECKTIE RACK
Filed March 5, 1938　　　3 Sheets-Sheet 1
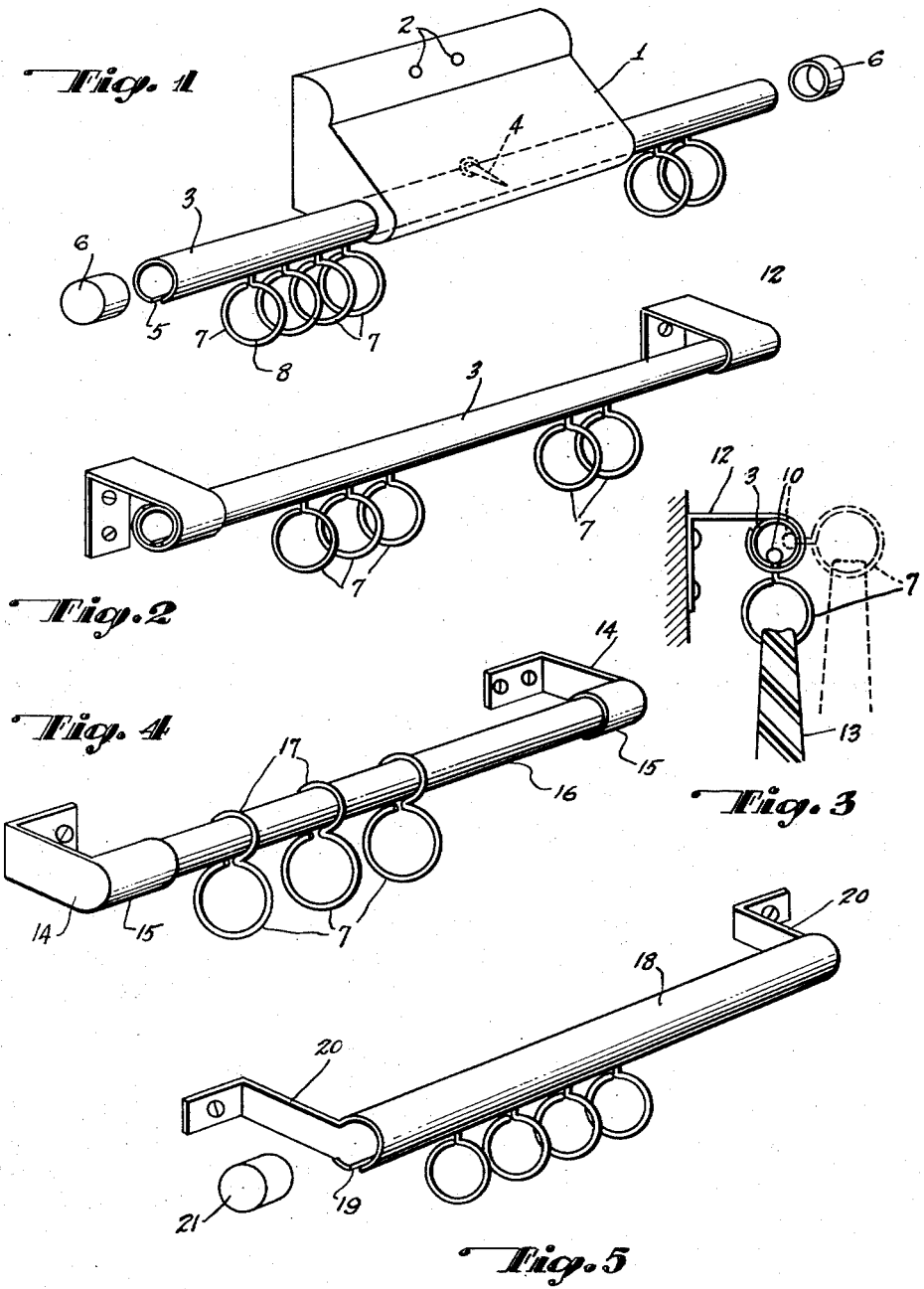
INVENTOR.
Abe R. Brothers
BY
Cornelius Zabriskie
ATTORNEY.

Feb. 21, 1939. A. R. BROTHERS 2,147,625
NECKTIE RACK
Filed March 5, 1938 3 Sheets-Sheet 2
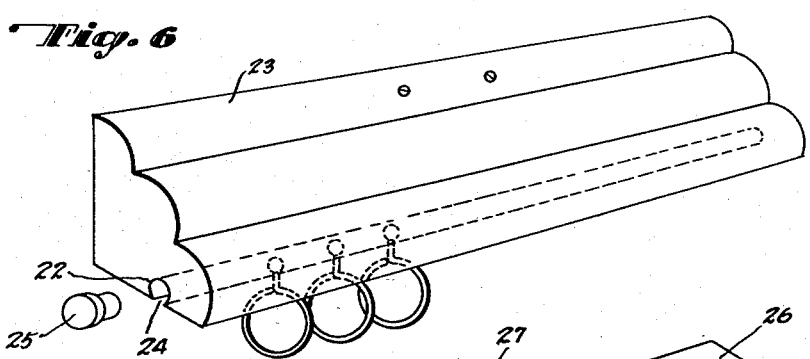
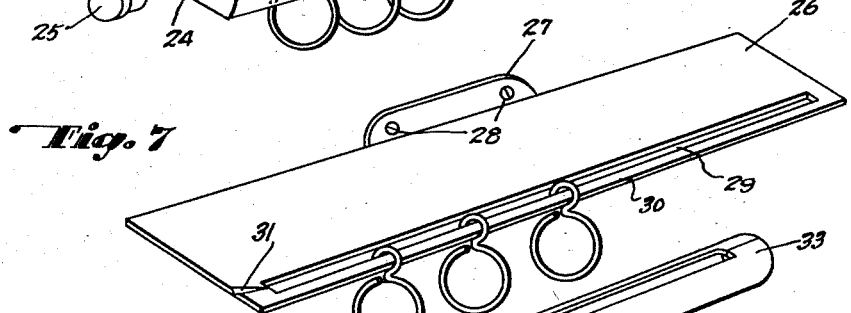
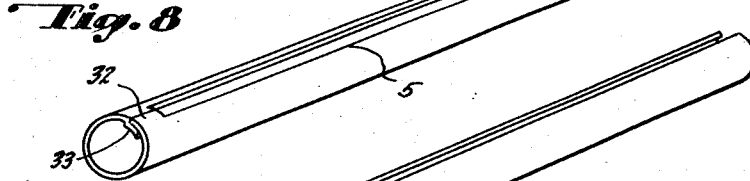
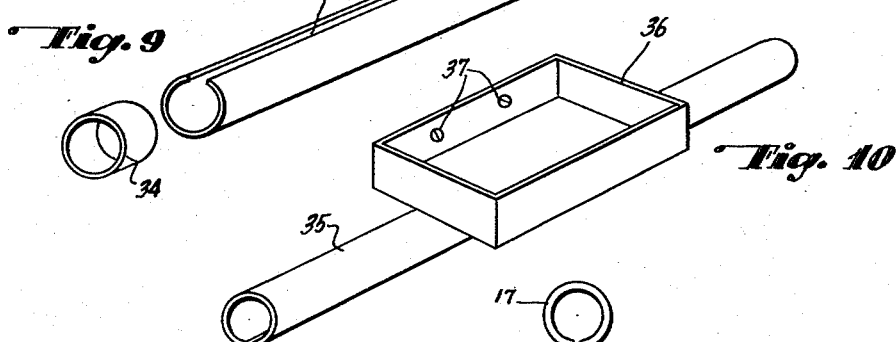
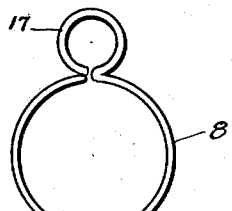
INVENTOR.
Abe R. Brothers
BY
Cornelius Zabriskie
ATTORNEY.

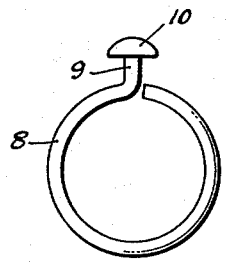
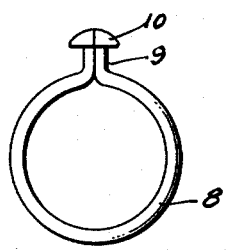
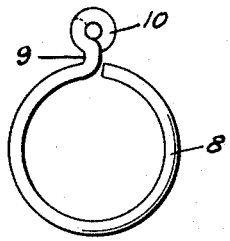
Fig. 12  Fig. 13  Fig. 14
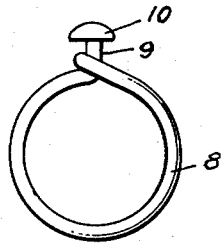
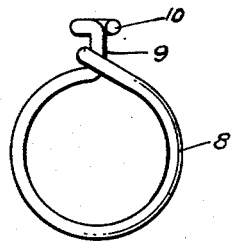
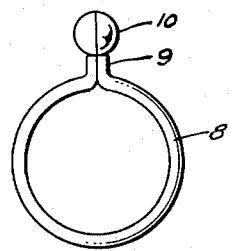
Fig. 15  Fig. 16  Fig. 17
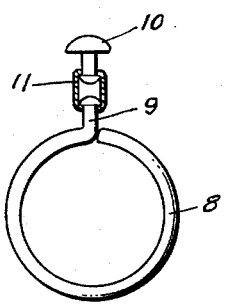
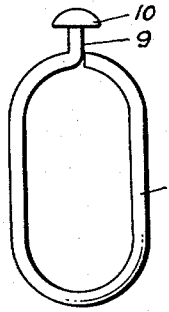
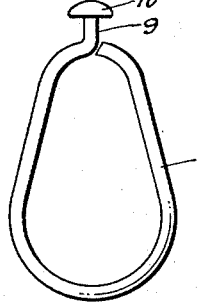
Fig. 18  Fig. 19  Fig. 20
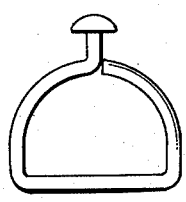
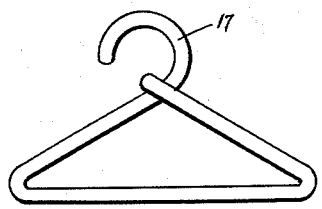
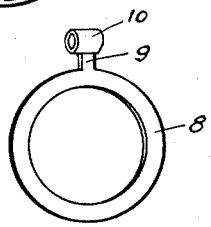
Fig. 21  Fig. 22  Fig. 23
INVENTOR.
Abe R. Brothers
BY Cornelius Kalnike
ATTORNEY.

Patented Feb. 21, 1939

2,147,625

UNITED STATES PATENT OFFICE 2,147,625

NECKTIE RACK

Abe R. Brothers, Brooklyn, N. Y.

Application March 5, 1938, Serial No. 194,148

3 Claims. (Cl. 211—123)

This invention is primarily intended for use as a necktie rack adapted to support neckties individually and in such manner that they may be severally removed without disturbing the remaining ties supported on the rack.

The invention is characterized by the provision of a number of supporting hangers through which the neckties may be individually suspended and which hangers are mounted for sliding movement longitudinally of a guide and for individual rotary movement with respect thereto, whereby all portions of any particular tie may be exposed to view and such tie conveniently segregated and removed without disturbing the other ties supported on the rack.

The object of the invention is to provide a simple and economical construction and one which will permit of a support of a large number of ties in conveniently removable position and in such manner that the ties may be easily selected.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figures 1 and 2 are perspective views showing different forms of the present invention.

Figure 3 is an end view of the structure of Figure 2.

Figures 4–7 show further modified forms of the invention.

Figures 8 and 9 show different forms of guides which may be employed.

Figure 10 is a perspective view showing a somewhat different form of mounting for the guide.

Figures 11–23 illustrate different forms of supporting hangers which may be used.

Referring first to Figure 1, I indicates a bracket which may be made of wood or any other suitable material and may be of any appropriate shape and design desired. It is provided with two holes 2 through which screws may be passed to mount the bracket on a door or other fixed support. The bracket is provided on its under side with a longitudinal channel in which is supported a transversely extending tubular guide 3 rigidly held by tightly fitting it in place or by other means, e. g., a screw 4 screwed through the back or bottom of the bracket and into engagement with the guide.

The guide 3 may partake of various forms. It may be of polygonal cross section, but is shown in Figure 1 as a split tube of circular cross section having at its lower side a longitudinal slot 5. The ends of the guide are closed by caps 6 which are removable when desired but which normally close the ends of the guide and seal the ends of the slot 5, so that slidable hangers 7, operating through said slot, are normally precluded from inadvertent dislodgement therefrom.

The hangers which may be employed in the construction of Figure 1 may vary within wide limits, but as shown in Figures 12–21 and 23, they comprise a loop 8 having a shank 9 surmounted by a head 10. The head 10 is adapted to be rotatably received within the interior of the guide tube 3 and is sufficiently large to preclude its passage through the slot 5. The shank 9 extends through the slot and supports the loop 8 below the guide. With this arrangement, the hangers are adapted to slide freely, longitudinally of the guide and to freely rotate with respect thereto, and each loop is adapted to receive a necktie or other article which it is desired to support thereon.

As shown in Figures 12–23, the loops may be made in various shapes. These figures are illustrative, but are not intended to be exclusive. As also illustrated by these figures, the heads 10 may vary widely in shape and formation and they may be formed by swedging one or both ends of a wire rod from which the loop is formed, as shown in Figures 12, 13, 15, 19, 20 and 21, or by swedging both ends of the rod, as shown in Figures 13 and 17, or by bending the ends of the rod into a loop, as shown in Figures 14 and 23, the latter of which figures shows the structure bent up from sheet metal. Similarly, instead of swedging the head, as shown in Figures 13 and 17, collectively, from both ends of the rod, the head sections in these figures may be made integral with one another as a hemisphere or ball and welded or otherwise secured to the butt ends of the rod which form the loop. Likewise the shank may be made rigid with the loop or may have incorporated therein a swivel 11 as indicated in Figure 18. These figures are thus illustrative of a wide variety of ways in which the supporting hanger may be made, and it will be understood that the features of these various structures may be used interchangeably in the several structures without departing from the invention.

Most of the loops which I have shown are provided with curved lower portions for the reason that, when a tie is suspended through such a loop, as shown in Figure 3, that portion of the tie which engages the loop will be transversely curved or deformed. This deformation or transverse curvature will tend to lock the tie against longitudinal shifting with respect to the loop for when a tie is bent in this way it will not have a tendency to slip, but will rather tend to maintain the position in which it is placed. This is true even though the tie may be hung up hurriedly with one end heavier or longer than the other. When the curved bottom loop is employed, there is little possibility that the ties will become inadvertently dislodged or slide from the loops.

Furthermore, by permitting the heads 10 of the hangers to freely rotate within the tubular guide, it is possible to obtain one hundred per cent visibility of the tie whereby all parts of a tie supported on any particular ring may be exposed to view at the will of the user.

The structure of Figure 2 is in many respects similar to that of Figure 1, but instead of employing a single centrally disposed bracket 1, I employ, in Figure 2, two brackets 12, the outer ends of both of which are coiled around the ends of the guide tube 3, so as to support the said guide at its opposite ends. The guide tube 3 is of the same structure as in Figure 1, but the caps 6 need not be employed, for the brackets will close the ends of the slot 5 in such manner as to preclude inadvertent disengagement of the supporting hangers from the slot. The guide tube 3 may be gripped tightly by the brackets or may be held in the brackets in such manner as to permit of turning of the rod, whereby the rod may be rotated, as shown in Figure 3, to move the tie supporting hangers into more accessible position. In this latter figure, one tie 13 is indicated in its normal position in full lines and in its more accessible position in dotted lines. If desired, the brackets 12 may be provided with stops or flanges overlying the ends of the guide tube, so as to preclude longitudinal movement of the tube as it is rotated.

In Figure 4 brackets 14 are shown as provided with chambered bosses 15 adapted to receive the opposite ends of a guide rod 16. This rod may be a tubular or slotted rod and may be of the character shown at 3 in Figures 1 and 2, with a slot in its under side to receive the shanks of the supporting hangers. However, as shown in Figure 4, the rod is unslotted and each supporting hanger is provided with a small ring or hook 17 occupying the same plane as the loop 8 and adapted to embrace the rod for sliding movement thereon. The loops 8 of these supporting hangers may likewise be made of any appropriate shape as previously described and may be formed, for example, as shown in Figures 11 and 22.

In Figure 5, the tubular guide 18 is slotted at its under side at 19 and is provided at its opposite ends with integral extensions 20, folded rearwardly and laterally to form supporting brackets. Plugs 21 are adapted to be inserted in both ends of the tubular guide to hold the hangers in place.

In the construction of Figure 6, the use of an independent guide is made unnecessary by the formation of an undercut guide channel 22 directly in the under side of an elongated bracket 23. The heads of the respective hangers operate within this channel which is provided at its bottom with a constricted slot 24 through which said heads cannot pass. The ends of the channel are closed by plugs 25 which preclude disengagement of the hangers through the ends of the channel.

In the structure of Figure 7, a flat plate 26, preferably of metal, is provided at its back edge with an upstanding flange 27 by means of which it may be attached to a firm support by screws 28. The plate is slotted at 29 and I may associate with this slot, hangers of any of the types shown in Figures 12–21 and 23. However, the form of hanger shown in Figures 11 and 22 may be conveniently associated with this type of construction by so arranging the small hook 17 of the hanger that it will embrace the narrow strip 30 between the slot 29 and the adjacent margin of the plate. The hooks may be bent into shape about this strip or may be left slightly open, as shown in Figure 22, to be sprung into place through a zone of decreased thickness indicated at 31 in Figure 7.

Figure 8 shows a modified form of tubular guide wherein the ends of the slot 5 are closed by overlapping portions 32 and 33 at the ends of the tube, while in Figure 9, the tubular guide is as shown in Figures 1 and 2, but the end of the slot 5 is adapted to be closed by a ring or bushing 34 adapted to embrace each end of the tube. The tubular guides shown in Figures 8 and 9 may be used in any of the constructions which I have described as employing the tubular guides.

Figure 10 shows a tubular guide 35 of any of the forms hereinbefore described, spot welded, screwed or otherwise secured to a receptacle 36 of any appropriate shape which is adapted to function as a supporting bracket when the receptacle is secured in place on a firm support by means of screws 37.

In all of the several structures which I have described a number of supporting hangers are provided, each adapted to individually support a tie or other article in such manner that the removal of a tie from any particular hanger will not disturb the relation between the other hangers and the articles which they support. The hangers may be severally and collectively shifted longitudinally of the guides and rotated to allow the choice of a tie and to permit of the removal of a tie without interfering with the other articles supported by the device. A large number of articles may be supported in this way and the particular supporting hangers from which it is desired to remove any particular article may be readily segregated from the others so as to allow of sufficient space to remove or insert an article without disturbing the relation between the other articles so supported. Furthermore the structures are such that hangers may be added from time to time as desired and this may be accomplished in most cases without removing the bracket or brackets from the wall.

The structure is such that it may be economically manufactured. It is durable and neat in appearance and provides a convenient medium for supporting neckties and other small articles in a thoroughly satisfactory manner.

In the foregoing detailed description I have set forth different forms of the present invention, each of which embodies particular features of construction, but I wish it understood that these various features may be used in other combinations than those in which they are particularly shown. For these reasons, the foregoing description is to be understood as illustrative only and the invention is to be construed as fully commensurate with the appended claims.

Having thus fully described the invention, what I claim as new and desire to secure by Letters Patent is:

1. A necktie rack comprising a bracket adapted to be affixed to a firm support, a hollow guide attached intermediate its ends to the bracket with the opposite end portions of the guide projecting laterally beyond the opposite sides of the bracket, said guide having in its lower side a slot extending longitudinally thereof and of a width to receive the shanks of necktie supporting loops with the heads of the shanks confined within the hollow guide and with the supporting loops free from contact with said firm support, and closure means at each end of the hollow guide to preclude inadvertent passage of the heads of the necktie supporting loops outwardly through the ends of the guide, said closure means being manually removable to permit necktie supporting loops to be associated with and removed from the guide.

2. A necktie rack comprising a bracket adapted to be affixed to an upright surface and provided on its under side with a transverse undercut channel extending substantially parallel to said surface, a hollow guide extending through said undercut channel and projecting for distances beyond both ends thereof and provided in its under side with a longitudinal slot of a width to receive the shanks of necktie supporting loops with the heads of the shanks confined within the tubular guide and with the supporting loops free from contact with said upright surface, means for securing the hollow guide against longitudinal movement in said channel, and a closure member at each end of the hollow guide to preclude inadvertent passage of the heads of the necktie supporting loops outwardly through the ends of the guide.

3. A necktie rack comprising a bracket adapted to be affixed to a firm support and chambered to form a receptacle, a hollow guide attached intermediate its ends to the bracket with the opposite end portions of the guide projecting laterally beyond the opposite sides of the bracket, said guide having in its lower side a slot extending longitudinally thereof and of a width to receive the shanks of necktie supporting loops with the heads of the shanks confined within the hollow guide and with the supporting loops free from contact with said firm support, and closure means at each end of the hollow guides to preclude inadvertent passage of the heads of the necktie supporting loops outwardly through the ends of the guide, said closure means being manually removable to permit necktie supporting loops to be associated with and removed from the guide.

ABE R. BROTHERS.